United States Patent [19]
Nickols, Jr. et al.

[11] 3,940,285
[45] Feb. 24, 1976

[54] CORROSION PROTECTION FOR A FUEL CELL COOLANT SYSTEM

[75] Inventors: Richard C. Nickols, Jr.; John C. Trocciola, both of Glastonbury, Conn.

[73] Assignee: United Technologies Corporation, Hartford, Conn.

[22] Filed: Dec. 13, 1974

[21] Appl. No.: 532,565

[52] U.S. Cl................................................ 136/86 R
[51] Int. Cl.².......................................... H01M 8/04
[58] Field of Search............... 136/86 R, 86 B, 86 E

[56] References Cited
UNITED STATES PATENTS

| | | | |
|---|---|---|---|
| 3,370,984 | 2/1968 | Platner............................... | 136/86 R |
| 3,515,593 | 6/1970 | Nickols............................... | 136/86 R |
| 3,761,316 | 9/1973 | Stedman............................. | 136/86 R |

*Primary Examiner*—John H. Mack
*Assistant Examiner*—H. A. Feeley
*Attorney, Agent, or Firm*—Stephen E. Revis

[57] ABSTRACT

The internal coolant system of a fuel cell power plant utilizes a gas in the coolant fluid to inhibit the corrosion of those fuel cell components that corrode due to shunt currents flowing through the coolant fluid. In a preferred embodiment hydrogen gas is used.

24 Claims, 5 Drawing Figures

CORROSION PROTECTION FOR A FUEL CELL COOLANT SYSTEM

BACKGROUND OF THE INVENTION

1. Field of the Invention

This invention relates to fuel cells, and more particularly, to corrosion prevention in the coolant systems thereof.

2. Description of the Prior Art

In a fuel cell stack the individual fuel cells are separated by plates made of conductive material such as carbon. The plates separate the reactant gases in adjacent fuel cells from each other and are also usually electrically connected in series to each other to carry electricity between the cells. A load is connected across the stack to complete the circuit. During operation electrons flow from the negative end of the stack to the positive end of the stack through the load. There is generally a large potential drop from one end of the stack to the other made up of smaller potential drops between adjacent cells. Heat generated by the fuel cell stack is often removed by flowing water or other fluids through channels in the separator plates between the cells. These fluids are often ionically conductive. Generally the water is manifolded to pass through separator plates in parallel where it is collected in a manifold at the other side of the cells; the heat of the cell may change the water to steam which may be used in various components of a fuel cell system, or the heat adsorbed by the water may simply be radiated out to the atmosphere and the water recirculated through the stack. Because of the potential difference between the ends of the fuel cell stack and due to the manifolding of the water from one end of the stack to the other, and because the water is in contact with the current conducting and electrically connected separator plates, shunt currents flow through the water. These shunt currents cause the carbon plates nearest the positive end of the stack to corrode with time which can be a serious problem in fuel cells which must operate continuously for many thousands of hours.

One solution, called edge cooling, involves flowing the coolant at the edges of the cells only (i.e., no flow between cells). The coolant is electrically insulated from the cells and thus no shunt currents are present. This technique often results in an unacceptable temperature distribution across the stack. Another common solution is to use a dielectric coolant which cannot carry current. However, a dielectric is not as good a coolant as water and it may also be more expensive than water.

SUMMARY OF THE INVENTION

A primary object of the present invention is to inhibit the corrosion that takes place in the coolant system of a fuel cell stack due to shunt currents passing through the coolant fluid.

According to the present invention, an oxidizable gas is provided in an ionically conductive coolant fluid of the fuel cell stack to prevent corrosion of carbon and oxidizable metal components in contact with the coolant caused by shunt currents flowing therethrough. Hydrogen is a preferred gas because it is oxidized at a potential lower than the potential at which carbon and metals are oxidized at the level of shunt currents often encountered in a stack. When hydrogen is added to the coolant the hydrogen is oxidized rather than the oxidizable material of the coolant system component. The hydrogen is readily available for this purpose since it or a hydrogen containing gas is usually used as fuel for the stack.

In a preferred embodiment a hydrogen oxidation catalyst (such as platinum) is provided in electrical contact with the corrodible component to decrease the electrochemical polarization at a given level of shunt currents; another way to put it is that the catalyst increases the tolerable level of shunt currents by increasing the limiting shunt current level for hydrogen oxidation.

The subject matter of this application is related to the subject matter of commonly owned United States patent application titled "Corrosion Protection for a Fuel Cell Coolant System" by M. Katz, S. Smith, and D. Reitsma filed on even date herewith.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
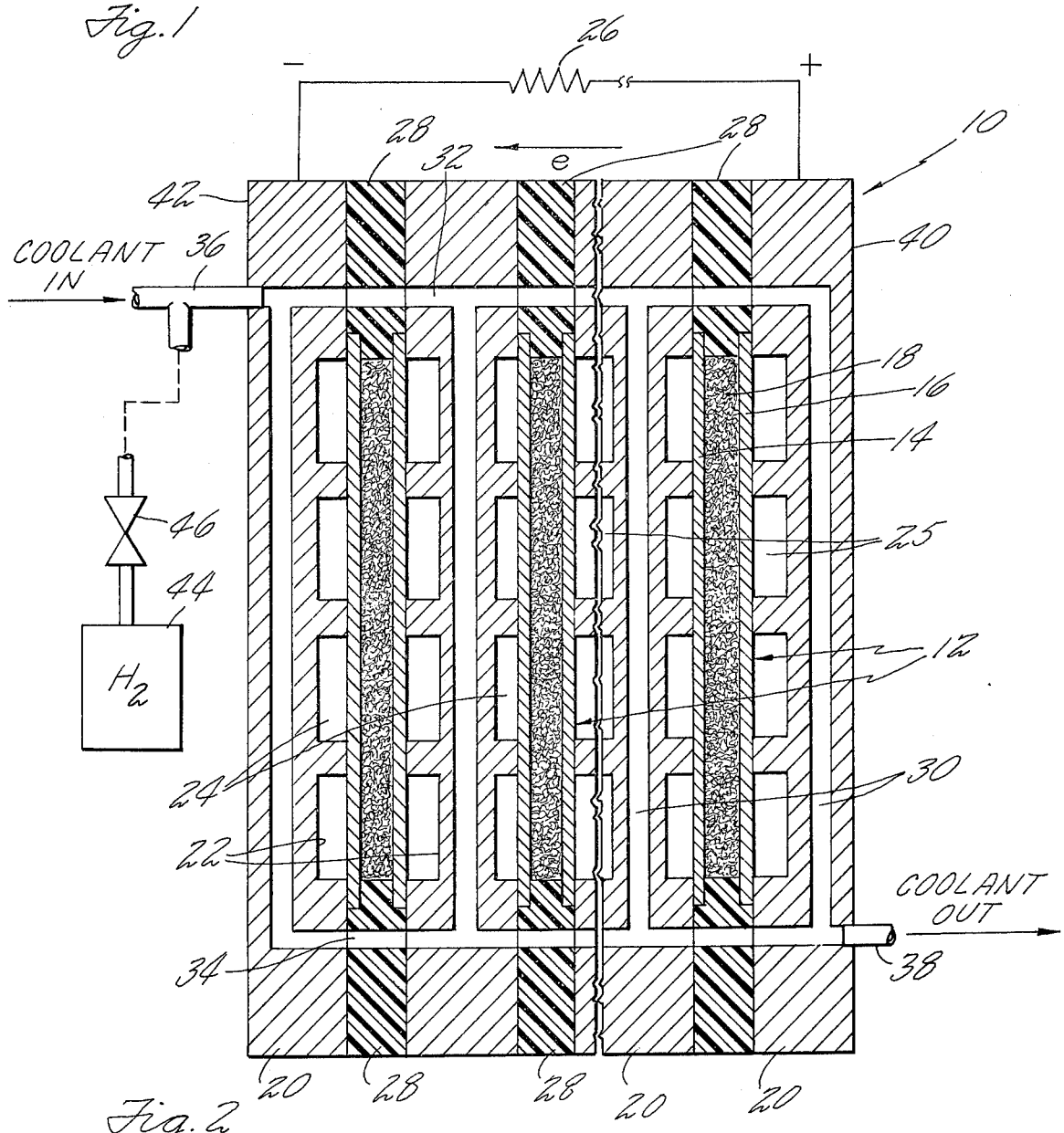
FIG. 1 is illustrative of a fuel cell stack which utilizes the present invention.

FIG. 1 is an illustrative representation of a typical fuel cell stack 10 in which the present invention may be used. The stack 10 is comprised of a plurality of fuel cells 12 each including an anode electrode 14 and cathode electrode 16. Trapped between these electrodes is an electrolyte containing matrix 18 which holds a liquid electrolyte in contact with the surfaces of the electrodes 14, 16. (This invention is also useful for other types of fuel cells wherein the electrolyte is a free liquid, rather than retained in a matrix.) The individual cells 12 are separated by separator plates 20, the first and last plates 20 of the stack generally being referred to as end plates rather than separator plates because they do not actually separate adjacent cells. Each of the plates 20 includes grooves 22 formed therein which define fuel and oxidant gas spaces 24, 25 adjacent the nonelectrolyte sides of the electrodes 14, 16, respectively. Means are also provided, but are not shown, for introducing and removing the fuel and oxidant from the gas spaces 24, 25 in accordance with well known techniques. The plates 20 are made from an electrically conductive material such as carbon (The term "carbon" is intended to encompass "graphite" within its meaning.) or a metal and are connected electrically in series with each other and with a load 26. Electrically insulating end seals 28 help retain the electrolyte within the matrix 18 and also prevent the electrodes of the individual cells 12 from shorting out.

The plates 20 also include coolant channels 30 in heat exchange relationship with the cells 12. The channels 30 are fed from a coolant fluid manifold passage 32 and feed into a manifold passage 34 on the other side of the stack 10. The manifold passages 32, 34 may simply be a plurality of interconnected cylindrical passageways through the plates 20 and end seals 28. An ionically conductive liquid coolant is fed into the manifold passage 32 through inlet means 36. The coolant thereupon passes through the channels 30 of the separator plates 20 picking up heat generated by the cells 12 and exits from the stack through outlet 38. Although in this embodiment there are coolant channels 30 between every pair of cells 12, it may be sufficient in certain instances to pass coolant fluid through only every other plate 20 or through any suitable number of plates, but generally at regular intervals, as long as the temperature in one cell does not exceed its maximum operating temperature and as long as the temperature distributions within and between cells is tolerable.

Water is a very desirable and common coolant which is often used alone or mixed with an additive such as glycol to alter the boiling and freezing point. Manifolding the water, as in the embodiment of FIG. 1, results in an unbroken path of liquid through the manifold passage 32 from the positive end 40 of the stack to the negative end 42. Since the separator plates between adjacent cells are electrically conductive and connected in series through the cells 12, a large electrical potential may exist across the coolant fluid in the manifolds 32, 34 from the positive to negative end of the stack. This potential exists whether or not the circuit connecting the cell stack to the load 26 is open or closed (although it is somewhat lower when the circuit is closed). In order for shunt currents to flow through the coolant there must be some kind of electrochemical reaction at both the positive and negative ends of the stack at the interface between the coolant and the fuel cell coolant system components (which in this embodiment are the plates 20). In the case of an aqueous coolant hydrogen ions are produced at the positive end 40 of the stack [see equation (1) below] and flow through the water in the manifold passage to the negative end 42 of the stack where it is converted back to hydrogen gas. This shunt current corresponds to a load or drain on the stack 10.

For a given stack voltage (which is dependent on the number of cells in the stack) the magnitude of the shunt current through the water depends on the electrical resistance of the coolant fluid and the electrochemical reactions in the fluid at the positive and negative ends of the stack. Most of the potential drop across the coolant fluid is due to its electrical resistance. For example, in a 300 volt stack the IR drop across the coolant may be about 299 volts; this would leave only about 1 volts for the electrochemical reactions. The graphs of FIGS. 2–5 depict the electrochemical potential-shunt current relationships of various reactions which may occur between an aqueous coolant fluid and elements in the fluid; or between the fluid and the coolant system component in contact therewith.

Figure 2:
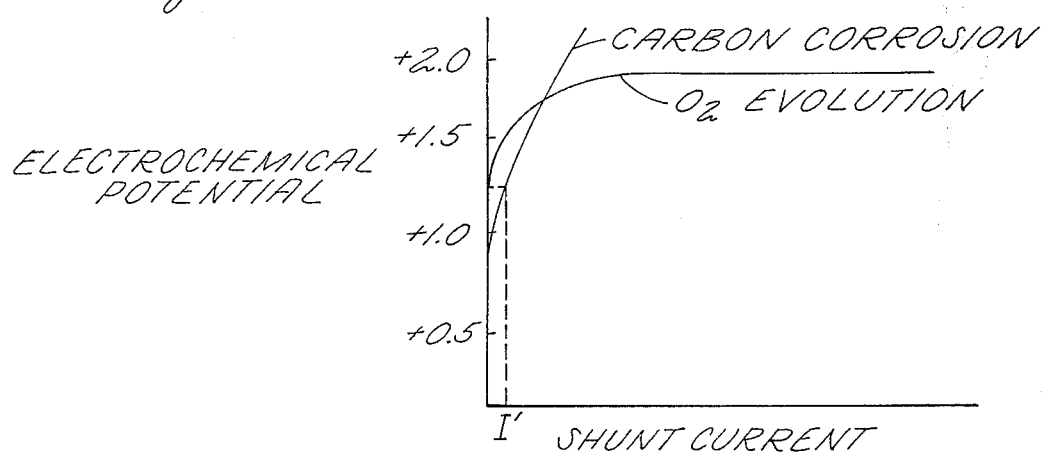
FIGS. 2–5 are graphs illustrative of various electrochemical reactions which may occur in the coolant system of a fuel cell stack of the type illustrated in FIG. 1.

Referring to FIG. 2, assume for the moment that the separator plates 20 contain carbon and the coolant is ordinary water with no additives and some ionic conductivity (which is the usual case). It can be seen that at an electrochemical potential of about 0.95 volt or above, the carbon in the components at the positive end 40 of the stack begin to react with the water when even the slightest positive shunt current exists according to the following formula:

$$C + 2H_2O \rightarrow CO_2 + 4H^+ + 4e \qquad (1)$$

This represents carbon corrosion of fuel cell components and is counter-balanced at the negative end 42 of the stack by the electrolysis of water to hydrogen according to the following reaction:

$$4H^+ + 4e \rightarrow 2H_2 \qquad (2)$$

Notice in FIG. 2 that when the shunt current reaches a level of I' there may also be oxygen evolution (the electrolysis of $H_2O$ to $O_2$) at the positive end of the stack (as well as carbon corrosion) according to the following reaction:

$$H_2O \rightarrow \tfrac{1}{2} O_2 + 2H^+ + 2e \qquad (3)$$

At this point the potential has exceeded about 1.2 volts, the theoretical voltage for oxygen evolution. As heretofore discussed it is an object of the present invention to prevent this corrosion at the positive end of the stack.

Figure 3:
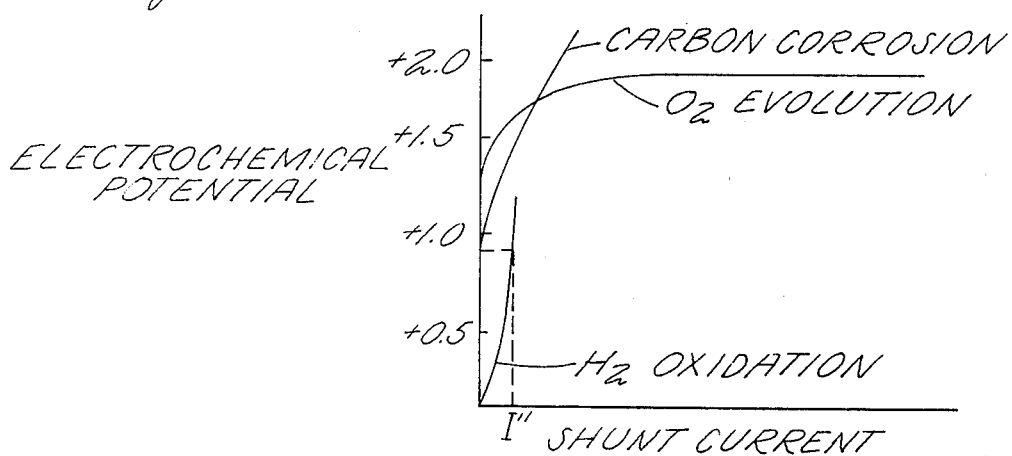

Consider, now, what happens when hydrogen is added to the water in accordance with the present invention. This is represented by the graph of FIG. 3 which is the same as the graph of FIG. 2 except for the presence of the hydrogen oxidation curve. It can be seen that for currents below about I" hydrogen is oxidized at a potential less than the potential required for the initiation of carbon corrosion. Thus, as long as the shunt currents are less than I" oxidation of hydrogen will take place at the positive end 40 of the stack according to the following reaction:

$$H_2 \rightarrow 2H^+ + 2e \qquad (4)$$

and there will be no carbon corrosion or oxygen evolution. When hydrogen oxidation occurs the corresponding reaction at the negative end 42 of the stack is the electrolysis of water to hydrogen (hydrogen evolution) according to the following reaction:

$$2H^+ + 2e \rightarrow H_2 \qquad (5)$$

The coolant used in the embodiment of FIG. 1 may, for example, be ordinary water plus hydrogen. The water may be converted to steam as it flows through the stack 12 and the steam from the stack may be used in a steam reformer for processing fuel. The hydrogen in the coolant is consumed at the positive end 40 of the stack 12 and evolved at the negative end 42. Thus, the steam leaving the stack by way of outlet 38 includes substantially the same amount of hydrogen as introduced into the coolant. It has been found that the hydrogen has no detrimental effect in the steam reformer. Since the hydrogen is not recovered there must be a continuous feed of hydrogen into the water. If a supply of pure hydrogen is available it can be injected directly into the water. For example, in the embodiment of FIG. 1 there is shown a hydrogen supply 44, the hydrogen being fed directly into the coolant fluid and being controlled by a valve 46. If the hydrogen is to be supplied from a hydrogen containing gas, such as the fuel gas for the fuel cell, pure hydrogen can be introduced into the water perhaps by diffusing the hydrogen through a suitable hydrogen diffusion membrane which prevents other components of the gas from entering the water. If these other gas components are introduced into the water, some of them might be harmful to the stack or to the steam reformer. If these other components are not harmful a hydrogen diffusion membrane may not be needed.

Although in this embodiment the coolant fluid is water and the oxidizable gas is hydrogen, the coolant fluid may be any ionically conductive fluid; the gas may be any gas which is not harmful to the system and which is oxidized at a potential lower than the potential at which the material of the coolant system corrodes at the level of shunt currents encountered, such as carbon monoxide.

It is also contemplated that this invention may be used in fuel cell systems wherein the coolant is contained in a recirculating loop which passes through the fuel cell stack. In that type of a system the coolant may be any ionically conductive fluid such as ordinary water or may be water mixed with an additive such as glycol. The hydrogen (or other oxidizable gas) which is added to the coolant is consumed at the positive end of the stack and is evolved at the negative end of the stack and is thereupon recirculated with the coolant from the outlet 38 to the inlet 36 and back to the positive end of the stack. Thus, the amount of hydrogen in the coolant remains substantially constant. A continuous supply of hydrogen to the coolant is therefore unnecessary in this embodiment except to make up for incidental losses due to leaks; this makeup hydrogen could be provided from the hydrogen supply 44.

Figure 4:
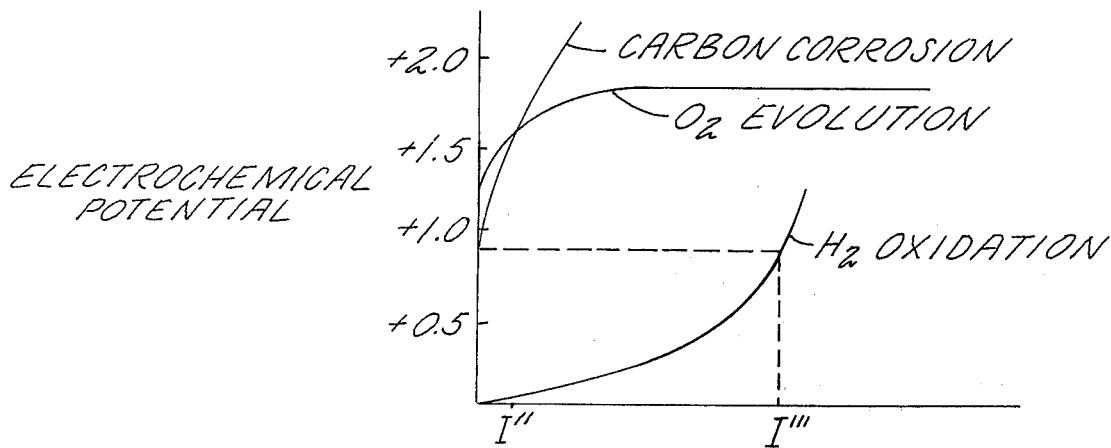

In the oxidation of hydrogen according to reaction (5) the carbon of the coolant system components (i.e., plates 20) at the positive end of the stack acts as a catalyst, although not a very good one. However, it may be suitable for very small shunt currents. Reaction (5) can be enhanced by adding any good hydrogen oxidation catalyst to the carbon components at the positive end of the stack such as by platinizing the carbon surfaces thereof. The graph of FIG. 4 is indicative of the electrochemical reactions occurring at the positive end 40 of the stack on a platinized carbon surface with hydrogen present in the water coolant. The platinum catalyst increases the rate of the electrochemical reaction at a given potential so that a shunt current of $I''$ may be present before carbon corrosion begins. The catalyst need only be present at the positive end of the stack, and may, for example, simply be a rod of platinum extending into the coolant fluid and in electrical contact with the carbon component. Other possible catalysts are any noble metal or nickel, although this invention is not intended to be limited thereto.

In general terms the reaction for metal corrosion at the positive end of the stack is represented generally as follows:

$$M \rightarrow M^+ + e \qquad (6)$$

and may occur if no hydrogen were present in the coolant and also at shunt currents greater than $I_a$ even if there were hydrogen in the coolant. Metal deposition (i.e., plating out) would be the corresponding reaction at the negative end of the stack as follows:

$$M^+ + e \rightarrow M \qquad (7)$$

Figure 5:
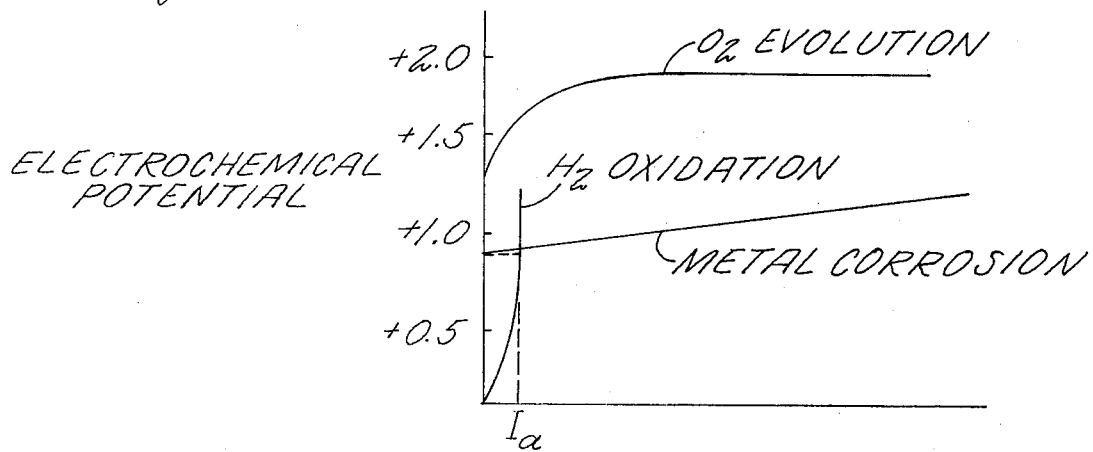

As well as preventing carbon corrosion, the addition of hydrogen to the coolant may be useful in preventing the corrosion of metals in general. For example, the addition of hydrogen can prevent the corrosion of metals such as nickel or stainless steel which are oxidizable at a potential higher than the hydrogen oxidation potential for the level of shunt currents usually encountered. This is shown in the graph of FIG. 5. A typical metal oxidation-reduction curve (i.e., metal corrosion curve) is shown in place of the carbon corrosion curve. This curve is representative of equation (6) above. This graph is purely illustrative, and the metal corrosion curve is not intended to represent any particular metal but is to illustrate that the oxidation of hydrogen occurs at a lower potential than the potential at which corrosion of some metals is initiated such that shunt currents are tolerable up to a value of $I_a$. Platinizing of the metal surface would also be advantageous in this situation. Thus, with hydrogen present in the coolant according to the present invention and shunt currents less than $I_a$ the reaction at the positive end of the stack is oxidation of the hydrogen (instead of metal corrosion) and at the negative end of the stack is electrolysis of water to hydrogen (instead of metal plating out), as hereinabove set forth in reactions (4) and (5), respectively.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. The combination of:
    a fuel cell stack having a positive end and a negative end and comprising a plurality of cells connected electrically in series, said stack including components defining coolant channels for carrying a coolant fluid into heat exchange relationship with said cells and a coolant manifold passage extending from the positive to the negative end of said stack for distributing a coolant fluid to said channels, said components comprising an oxidizable material and being in electrical communication with said fuel cells and connecting them in series electrically; and
    an ionically conductive coolant fluid within said manifold passage providing a path for shunt current from the positive to the negative end of said stack, said fluid including a gas mixed therein which oxidizes at the positive end of said stack at an electrochemical potential below which said material of said components at the positive end of said stack are oxidized for the level of shunt current through said fluid.

2. The combination according to claim 1 wherein said components include a separator plate between adjacent fuel cells and a separator plate at each end of said stack adjacent the end cells of said stack.

3. The combination according to claim 1 wherein said gas includes hydrogen.

4. The combination according to claim 2 wherein said plates include carbon and said gas includes hydrogen.

5. The combination according to claim 3 wherein said coolant fluid comprises water.

6. The combination according to claim 4 wherein said coolant fluid comprises water.

7. The combination according to claim 2 including means for introducing said gas into said coolant fluid.

8. The combination according to claim 7 wherein said gas includes hydrogen.

9. The combination according to claim 1 wherein said components at the positive end of said stack include an oxidation catalyst in electrical communication therewith and in contact with said coolant fluid to promote the oxidation of said gas.

10. The combination according to claim 9 wherein said components include carbon, said gas includes hydrogen, said catalyst includes platinum and said coolant fluid includes water.

11. The combination according to claim 1 wherein said components at the positive end of said stack comprise platinized carbon, said gas includes hydrogen, and said coolant fluid includes water.

12. In combination:
    a fuel cell stack having a positive end and a negative end and comprising a plurality of fuel cells connected electrically in series and including an ionically conductive coolant fluid for removing heat from said stack said fluid providing a path for shunt currents from the positive to the negative end of said stack; and means for introducing an oxidizable gas into said coolant fluid, said stack including oxidizable material in contact with said coolant fluid at the positive end of said stack, said oxidizable gas adapted to oxidize at the positive end of said stack at an electrochemical potential below which said oxidizable material of said stack at the positive end thereof is oxidized for the level of shunt current through said fluid.

13. The combination according to claim 12 wherein said coolant fluid includes water, said gas includes hydrogen and said material includes carbon.

14. The combination according to claim 13 wherein said material at the positive end of said stack includes platinized carbon.

15. In a process of operating a fuel cell stack having a positive end and a negative end and comprising a plurality of fuel cells connected electrically in series, said stack including an ionically conductive coolant fluid for removing heat from said stack said fluid providing a shunt from the positive to the negative end of said stack wherein corrosion of fuel cell components at the positive end of the stack and in contact with said coolant fluid may occur due to the shunt currents flowing through said coolant fluid, the process of preventing the occurrence of said corrosion including:

introducing an oxidizable gas into said coolant fluid wherein the gas is oxidized at the positive end of the stack in place of said corrosion.

16. The process according to claim 15 wherein said gas includes hydrogen and said coolant fluid includes water.

17. The process according to claim 16 wherein said fuel cell components at the positive end of the stack in contact with said coolant fluid includes carbon.

18. The process for preventing corrosion according to claim 15 including the step of providing an oxidation catalyst in contact with said coolant fluid at the positive end of the stack and in electrical communication with said fuel cell components at the positive end of the stack.

19. The process for preventing corrosion according to claim 18 wherein the step of providing a catalyst includes platinizing said carbon components at the positive end of said stack.

20. Fuel cell apparatus for preventing corrosion due to shunt currents including, in combination:

a fuel cell stack having a positive end and a negative end and comprising a plurality of fuel cells each including an electrolyte between a pair of electrodes, a separator plate sandwiched between adjacent fuel cells, and a separator plate at each end of said stack adjacent the end cells of said stack, said separator plates being in electrical communication with said fuel cells and connecting them in series electrically, a plurality of said separator plates having coolant channels therein for carrying a coolant fluid into heat exchange relationship with said fuel cells, said stack including at least one coolant fluid manifold passage extending from the positive end of said stack to the negative end of said stack for distributing coolant fluid to said coolant channels;

means for introducing an ionically conductive coolant fluid into said manifold passage and in contact with said separator plates wherein shunt currents flow through said fluid from the positive to the negative end of said stack; and means for introducing an oxidizable gas into said coolant fluid, said plates comprising material in contact with said coolant fluid and oxidizable at the positive end of the stack at a potential higher than the potential at which said gas is oxidized for the particular level of shunt current flowing through said coolant fluid.

21. The combination according to claim 20 wherein said coolant fluid includes water and said plates comprise carbon.

22. The combination according to claim 21 wherein said gas includes hydrogen.

23. The combination according to claim 22 wherein said plates at the positive end of said stack include a hydrogen oxidation catalyst in contact with said coolant fluid.

24. The combination according to claim 23 wherein said plates at the positive end of said stack are platinized.

* * * * *